United States Patent [19]

Tuovinen et al.

[11] 4,443,878
[45] Apr. 17, 1984

[54] METHOD OF MIXING A HOT FURNACE GAS WITH ANOTHER GAS BEFORE THE REMOVAL OF THE FURNACE GAS FROM THE FURNACE AND A HOOD THEREFORE

[75] Inventors: Frans H. Tuovinen, Ulvila; Bengt J. F. Norrman, Helsinki, both of Finland; Risto M. Heikkilä, Haparanda, Sweden

[73] Assignee: Outokumpu Oy, Outokumpu, Finland

[21] Appl. No.: 271,648

[22] Filed: Jun. 8, 1981

[30] Foreign Application Priority Data

Jun. 19, 1980 [FI] Finland ................................. 801983

[51] Int. Cl.³ ............................................. F27D 7/00
[52] U.S. Cl. ......................................... 373/9; 373/87; 373/73
[58] Field of Search ..................... 373/8, 9, 73, 86, 87; 432/65, 72

[56] References Cited

U.S. PATENT DOCUMENTS 3,909,499  9/1975  Stark ..................................... 373/87
3,997,711  12/1976  Stark et al. ............................ 373/9

Primary Examiner—Roy N. Envall, Jr.
Attorney, Agent, or Firm—Brooks, Haidt, Haffner & Delahunty

[57] ABSTRACT

A method and a hood for mixing a hot furnace gas with a second gas before the furnace gas is discharged from a furnace by directing the hot furnace gases out via a hood which forms an uninterrupted space for gas with the furnace is disclosed in which the second gas is fed along the side walls of the hood substantially counter-currently in relation to the hot gases emerging from the furnace in order to mix the gases with each other into a toroidal vortex, and that the gases are removed from this vortex tangentially.

15 Claims, 4 Drawing Figures

METHOD OF MIXING A HOT FURNACE GAS WITH ANOTHER GAS BEFORE THE REMOVAL OF THE FURNACE GAS FROM THE FURNACE AND A HOOD THEREFORE

BACKGROUND OF THE INVENTION

The present invention relates to a method of mixing a hot furnace gas with another gas before the hot furnace gas is removed from the furnace by directing the hot furnace gases out via a hood which forms an uninterrupted space for gas with the furnace space. The invention also relates to a cylindrical hood, intended for use in connection whith this method, the open end of the hood adjoining the gas space of the furnace and the hood having an outlet pipe for the hot gases treated in a controlled manner in the hood.

The invention relates in particular to a method of smelting and reducing raw material in a furnace, e.g. a method for smelting and reducing ferrosilicon or silicon in an electric-arc furnace, be feeding a reductant and the raw material to be reduced into the furnace and by removing the reduced material in the form of a melt from the bottom of the furnace and by removing the hot gases from a reducing-gas space above the melt by using a downwards open hood fitted on top of the electric-arc furnace, the hood having in its cover openings for electrodes and an outlet pipe for the gases and feed inlets for the raw material to be smelted and reduced and for the reductant.

It would often be desirable to reduce, oxidize or cool immediately the hot furnace gases emerging from the furnace, before they are discharged from the furnace gas space. The immediate oxidation, reduction or cooling of hot furnace gases has, however, proven to be very difficult because hot furnace gases have, as is well known, a very high viscosity. In addition, it would often be desirable to separate at least part of the dusts present in the hot flue gases, in order to return the dusts to the furnace before the hot furnace gases are discharged from the gas space of the furnace. As regards the hot furnace gases which contain combustible constituents, it would be especially desirable to burn these combustible constituents before directing the hot furnace gases out of the furnace gas space, so that the heat of combustion could be exploited to as high a degree as possible in the furnace itself. For this reason it would be especially important to be able to mix combustion air with such hot gases, which contain reducing constituents, already in connection with the furnace space itself in order to burn these gases in a controlled manner so that no overheating can occur and that the heat is at the same time recovered indirectly.

Previously known are various furnaces provided with hoods, in which the gases are led directly into the outside air or, after the treatment of the gas, into the outside air. These furnaces have a disadvantage in that the combustion air comes into contact with the furnace gas and the feed bed in an uncontrolled manner.

Previously known are various so-called semi-closed furnaces, i.e., the furnace is provided with a hood. The hood wall has openings provided with hatches. They have a disadvantage in that, for example, the hatch of some opening is open for the pick device of a ferrosilicon or silicon furnace, thereby causing air to come into contact with the furnace gas and the feed bed in an uncontrolled manner. This causes the following disadvantages: investments must be made in oversized gas treatment systems subsequent to the furnace, reductants present in the feed bed are wasted, furnace gases burn in an uncontrolled manned, thereby causing overheating and damage to the hood and electrodes or to other devices.

In order to eliminate the above disadvantages, there has now been provided a method and device by means of which the furnace gases can be treated in a controlled manner.

SUMMARY OF THE INVENTION

According to the present invention there is provided a method of mixing a hot furnace gas with a second gas before the furnace gas is discharged from a furnace by directing the hot furnace gases out via a hood which forms an uninterrupted space for gas with the furnace, in which the second gas is fed along the side walls of the hood substantially countercurrently in relation to the hot gases emerging from the furnace to mix the gases with each other into a toroidal vortex, and the gases are withdrawn from this vortex tangentially.

The present invention further provides a cylindrical hood which is open at that end which is intended to be connected to the gas space of the furnace, and having an outlet pipe mounted tangentially to the side wall of the hood for hot gases treated in the hood, and inlets in the circumference of the cover at the opposite end of the hood for feeding the second gas into the hood along its walls and substantially countercurrently in relation to the hot gases coming from the opposite, open end of the hood.

The hood according to the invention can be used in very different furnaces, but especially in ferrosilicon and silicon furnaces. In that case the purpose of the lower section of the masonry wall, inclined towards the furnace, of the constriction of the hood is to direct the pick device which is mounted in it. The pick device can be, for example, of the type described in greater detail in U.S. patent application Ser. No. 341,458.

A hood according to the invention can be connected to the rising shaft of a flash-smelting furnace or to a blast furnace in which case the hood adjoins the shafts of the said furnaces as an extension, but it is most advantageous to connect it to an electric-arc furnace or to a rotary kiln.

The hood according to the invention is made from pipes which are connected to each other by means of fins and are lined on the inside with bricks or some other heat-resistant mix. Inside the hood, studs are fitted to affix the masonry or mix. Water or water-vapor is fed into the pipes in order to cool the steel structure and to recover the heat from the furnace gases. The hood has advantageously a bend extending all the way around in order to divide the gas space into a higher, reducing, oxidizing or cooling zone and a lower, oxidizing or reducing zone, the feed inlets for the reductant or combustion air and/or oxygen being above the bend, as is also the tangential gas outlet pipe.

Air and/or oxygen or reducing gas is fed into the oxidizing or reducing zone in such a manner that it is directed and mixed with the gases rising from the reducing or oxidizing gas space to form a toroidal vortex, from which the gases are removed tangentially. In this manner, part of the dust can also be separated by means of centrifugal force.

Shield, oxidizing, reducing or cooling gas is fed in at the center of the hood cover. The shield gas protects the central part of the cover from overheating. Shield gas can also be directed to help to produce the rotational motion inside the hood.

DESCRIPTION OF THE PREFERRED EMBODIMENTS

Figure 1:
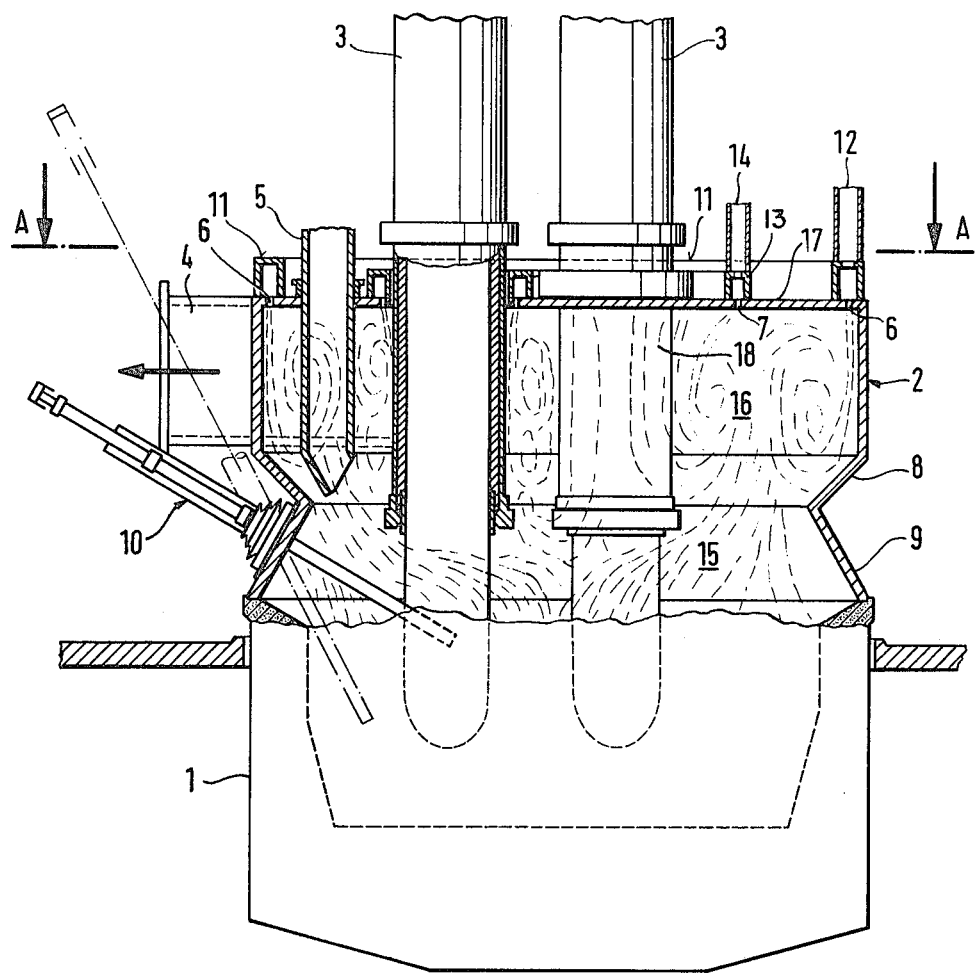
FIG. 1 depicts a cross sectional side view of an electric-arc furnace provided with a hood according to the invention.
Figure 2:
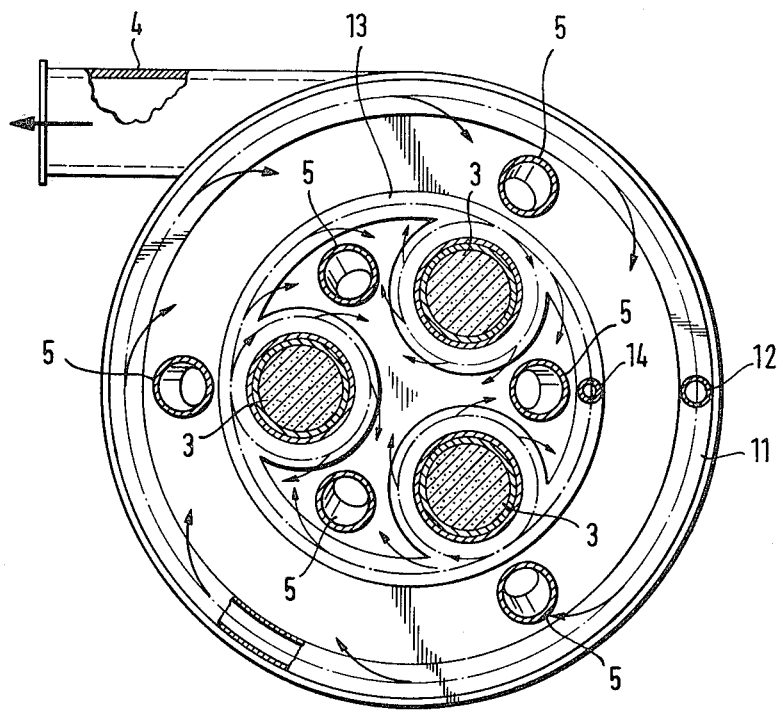
FIG. 2 depicts a section along line A—A in FIG. 1.

In FIGS. 1 and 2 the furnace is indicated by reference numeral 1, and the hood fitted tightly over it by means of a sand or liquid lock is indicated by reference numeral 2. Through the center part of the cover 17 of the hood 2 there are fitted symmetrically three electrodes, which are indicated by 3. In the upper section of the hood 2 there is, furthermore, a flue gas outlet channel 4, joining the side wall of the hood tangentially, and in the cover 17 of the hood there are, furthermore, several substantially vertical feed channels 5, fitted symmetrically in relation to the electrodes 3 and at even distances from each other; the raw material charge is fed into the furnace through these channels 5. Raw material is advantageously fed into the electric-arc furnace by means of a feeding ring (not in the figure) developed for this purpose and described in U.S. Pat. No. 3,900,117, granted Aug. 19, 1975, by feeding the raw material alternatively into six feed channels 5 around the electrodes 3.

On top of the cover 17 of the hood 2 there is, furthermore, a ring-like combustion-air distribution channel 1, parallel to the circumference of the cover; combustion air is fed into the channel 11 from the pipe 12 and is distributed and fed from the channel into the upper section of the hood via inlets 6 at the circumference of the cover, tangentially obliquely downwards in order to cool the wall of the hood 2.

On top of the cover 17 of the hood 2 there is, furthermore, a shield gas distribution channel 13, which encircles the electrode group and, in addition, each electrode 3 separately, and which has an inlet pipe 14 for feeding shield gas into its distribution channel 13 and for distributing it via openings 7 around each electrode 3 tangentially obliquely downwards around the electrodes 3 in the hood 2 in order to protect the electrodes 3 from the hot gases flowing in the hood.

In the lower section of the hood 2 there is a bend extending around the hood; the upper inclined section 8 of the wall of the bend faces away from the furnace 1 and the lower inclined section 9 of the wall faces towards the furnace, and the line of intersection between the sections of the wall divides the gas space of the hood 2 into an upper combustion zone 16 and a lower reduction zone 15. The purpose of the inclined wall section 8 facing away from the furnace 1 is to lead and direction the flow of combustion air flowing tangentially obliquely downwards from the inlets 6 at the circumference of the cover 17 of the hood 2 in such a manner that it does not impinge upon the coke bed on the surface of the melt in the electric-arc furnace but is mixed with the gases rising from the reduction zone 15, thereby forming a toroidal vortex which surrounds the electrode group and from which the flue gases are removed tangentially via the outlet channel 4.

The purpose of the lower inclined wall section 9 of the bend of the hood 2, facing towards the furnace 1, is to direct the pick device 10 installed in it and to bring the device closer to its target, i.e. the charge on the melt surface. The pick device 10 can be synchronized in relation to, for example, the feed, in which case the device evens out the charge arriving in the furnace 1, or in relation to the furnace current, in which case the pick device operates more often if the current fed into the furnace is lower, since in this case a hard crust is more easily formed on the surface of the melt. The pick device 10 operates for a few minutes at a time and a few times per hour, and in the meantime the spindle of the pick device is withdrawn from the furnace into a cooled casing which is articulated to the wall section 9 and is tiltable in different directions, as described in greater detail in U.S. patent application Ser. No. 341,458.

The lower section 9 of the wall is advantageously a ring tightly fitted between the furnace 1 and the hood 2 above the furnace by means of a liquid or sand lock, the ring being rotatable about the central axis of the furnace in order to change the position of the pick device 10 on the circumference of the hood 2, so that one and the same pick device 10 can be used for breaking at the desired points the crust forming on the melt surface and for evening out the charge fed onto the melt surface or for moving the charge to any desired point on the melt surface.

The hood is cooled by means of cooling pipes fitted in its walls and cover 17, not shown in detail in the drawing. The hood 2 can be manufactured from pipes which are connected to each other by means of fins, in which case inside the hood 2 there are attached studs to which the bricks or refractory material used as lining can be attached.

In addition, the hood can be insulated on the outside with rockwoll, and water or steam is fed into the cooling pipes in order to recover indirectly the heat from the hot gases flowing inside the hood.

Figure 3:
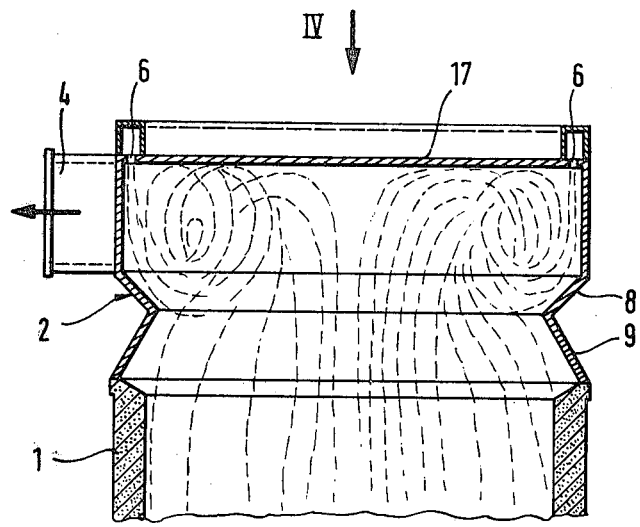
FIG. 3 depicts a cross sectional side view of an alternative hood.
Figure 4:
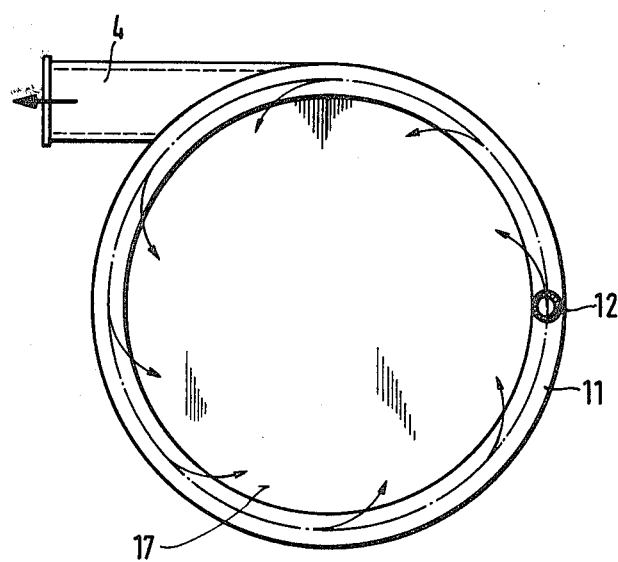
FIG. 4 depicts a top view of the hood of FIG. 3.

The feed channels 5 advantageously extend approximately as far as the reduction zone 15 in order to prevent the reductant present in the feed from combing into contact with the oxidizing atmosphere of the oxidation zone 16. Likewise, the electrodes 3 are preferably protected from the oxidizing atmosphere of the oxidation zone 16 by means of sleeve-like mantles 18 surrounding the electrodes 3, the sleeves extending as far as the reduction zone 15. FIGS. 3 and 4 show a hood which is suitable for being connected to some other furnace than an electric-arc furnace. In this case the furnace in general is indicated by 1 and the hood fitted on top of it by 2. The hood 2 is open at its lower end and has a bend 8, 9 extending all the way around; this bend divides the gas space of the furnace into an upper zone and a lower zone. In the zone above the bend 8, 9 there is formed a toroidal vortex, which is produced by feeding some other gas, such as combustion air, via the inlets 6 on the circumference of the cover 17 of the hood 2 obliquely downwards along the hood walls, the upper section 8 of the wall of the bend 8, 9 directing the combustion air flow towards the central axis of the hood, and the lower section 9 of the wall of the bend 8, 9 directing the hot gases rising from the furnace 1 also towards the central axis of the hood 2 before these hot gases are mixed with the combustion air and form a toroidal vortex. In this manner the combustion air and the hot furnace gases can be mixed effectively with each other and the combustion can be controlled so that overheating cannot occur. Flue gases are removed tangentially from this toroidal vortex via a tangential outlet pipe 4 connected to the upper section of the hood 2. The combustion air feed inlets 6 are directed obliquely downwards so that they promote the rotation of the toroidal vortex around the vertical central axis of the hood in a direction which promotes the removal of the flue gases via the tangential outlet pipe 4. If it is desired that the hood returns the dusts, the tangential outlet pipe for flue gas must be projected into the hood space so that the dusts pass it along the walls and flow back to the previous stage.

It is evident that the hood according to the invention can just as well be installed on the side of the furnace as on top of it, but if the hot gases contain solid particles it is advantageous to install the hood on top of the furnace, in which case the dusts separated from the gases in the toroidal vortex by centrifugal force fall by gravity back into the furnace.

What is claimed is:

1. A method of mixing a hot furnace gas with a second gas before the furnace gas is discharged from a furnace by withdrawing the hot furnace gases via a hood which forms an uninterrupted space for gas with the furnace, comprising feeding the second gas along the side walls of the hood substantially countercurrently in relation to the hot gases emerging from the furnace in order to mix the gases with each other into a toroidal vortex, and withdrawing the gases from this vortex tangentially.

2. A method according to claim 1, in which a feed of the second gas is directioned obliquely to the flow of the hot gas emerging from the furnace in order to cause the toroidal vortex to rotate around the central axis of the hood in a direction which promotes the tangential removal of the gases from this toroidal vortex.

3. A method according to claim 1, in which the flows of the hot gas coming from the furnace and the second gas coming along the side walls of the hood from a substantially opposite direction are directed approximately towards the central axis of the hood before they impinge against each other, in order to cause the gases to flow around the circular central axis of the toroidal vortex so that inside the circular central axis of the toroidal vortex the flow is substantially parallel to the flow of hot gas from the furnace, and that outside the circular central axis of the toroidal vortex it is parallel to the flow of the second gas flowing along the walls of the hood.

4. A method according to claim 1, in which the second gas or some other gas is fed from a center part of a cover of the hood in order to protect the cover from overheating.

5. A method according to claim 1, in which the hot gas is a reducing gas rising from an electric-arc furnace, and the second gas is oxygen, air or both, by means of which the hot reducing gas is burned in order to generate heat and to recover the heat both directly and indirectly from a hood above the furnace, and that the flue gases are withdrawn tangentially.

6. A method according to claim 5, in which part of the flue gases is returned to an upper section of the hood and directed around the electrodes in order to protect the electrodes from the hot gases.

7. A method according to claim 5, in which the oxygen, or air-mixture thereof and the gases rising into the hood from the reducing gas space of the furnace are directed and mixed with each other into a toroidal vortex encircling the electrode group.

8. A cylindrical hood for mixing a hot furnace gas with a second gas before the furnace gas is discharged from a furnace which is open at that end which is intended to adjoin the gas space of the furnace, comprising an outlet pipe mounted tangentially to the side wall of the hood for hot gases treated in the hood, and inlets in the circumference of the cover at the opposite end of the hood for feeding the second gas into the hood along its walls and substantially countercurrently in relation to the hot gases coming from the opposite, open end of the hood.

9. A hood according to claim 8, further comprising a bend extending around the hood in order to divide the inside of the hood into two zones, the tangential outlet pipe being mounted in the zone delimited by the hood cover and the bend.

10. A hood according to claim 8, in which the feed inlets for the second gas are directioned obliquely to the rotational direction determined by the outlet pipe.

11. A hood according to claim 8, in which in the center part of the cover there is one or several feed inlets for the second gas or some other gas.

12. A hood according to claim 8, further comprising at least one member articulated to that section of the wall of the bend which faces the open end of the hood and being capable of being rotated in different directions, for moving the raw material fed onto the surface of the melt or for breaking the crust on the surface of the melt or both, when the member is rotated about its joint.

13. A hood according to claim 12, in which the construction or at least that section of its wall which is provided with the rotatable member, is a separate ring, tightly encircling the hood and capable of being rotated about the vertical axis of the hood to move the member to different points on the circumference of the hood.

14. A hood according to claim 11, further comprising in its cover around the electrode inlets, several inlets for feeding shield gas into the hood around the electrodes.

15. A hood according to claim 9, in which the construction has an upper oblique wall section facing away from the open end of the hood in order to direct the gases in the upper, oxidizing zone into a toroidal vortex encircling the group of electrodes.

* * * * *

UNITED STATES PATENT AND TRADEMARK OFFICE
CERTIFICATE OF CORRECTION

PATENT NO. : 4,443,878
DATED : April 17, 1984
INVENTOR(S) : Frans H. Tuovinen et al It is certified that error appears in the above-identified patent and that said Letters Patent is hereby corrected as shown below:

Column 3, line 37:

"distribution channel 1" should be --distribution channel 11--.

Column 4, line 44:

"feed from combing" should be --feed from coming--.

Signed and Sealed this

Twenty-eighth Day of August 1984

[SEAL]

Attest:

GERALD J. MOSSINGHOFF

Attesting Officer

Commissioner of Patents and Trademarks